UNITED STATES PATENT OFFICE.

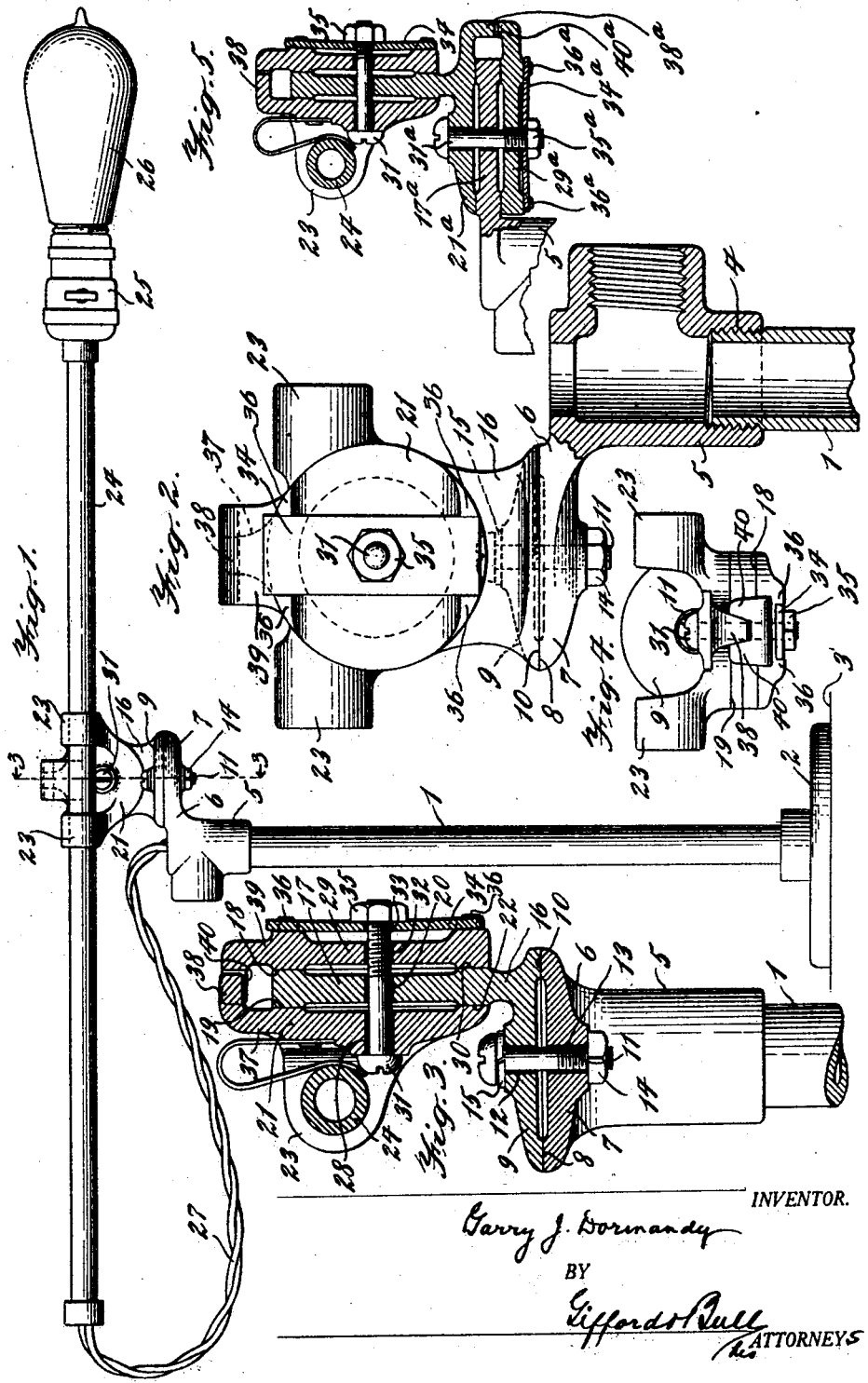

GARRY J. DORMANDY, OF TROY, NEW YORK, ASSIGNOR OF ONE-HALF TO UNITED SHIRT & COLLAR COMPANY, OF TROY, NEW YORK, A CORPORATION OF NEW YORK.

LIGHTING FIXTURE.

1,409,685.  Specification of Letters Patent.  Patented Mar. 14, 1922.

Application filed January 8, 1921. Serial No. 435,796.

*To all whom it may concern:*

Be it known that I, GARRY J. DORMANDY, a citizen of the United States, residing at Troy, in the county of Rensselaer and State of New York, have invented certain new and useful Improvements in Lighting Fixtures, of which the following is a specification.

My invention relates to new and useful improvements in lighting fixtures, and more particularly contemplates an improved support for so supporting a lamp or light so that the latter may be conveniently adjusted to a desired position.

The invention consists in the improvements to be more fully described hereinafter, and the novelty of which will be particularly pointed out and distinctly claimed.

I have fully and clearly illustrated a preferred embodiment of my invention in the accompanying drawings to be taken as a part of this specification, and wherein—

Figure 1 is a view in front elevation.

Fig. 2 is a view in rear elevation, partly in section.

Fig. 3 is a section on the line 3—3 of Fig. 1.

Fig. 4 is a detailed top plan view, and

Fig. 5 is a sectional view of another embodiment of the same invention.

Referring to the drawings by characters of reference—

1 designates a hollow vertical standard or pedestal provided with a base 2 adapted to rest on, and be secured by any suitable means to the surface of a work-table or other support, indicated generally at 3. Threaded, as at 4, or otherwise suitably secured to the upper end of the standard 1, is a coupling member 5 having a rigid arm 6 preferably integral therewith, and forming one of the elements of an adjustable or swivel joint, as will be hereinafter described. The arm or member 6 carries a disk member 7, preferably circular in plan view, and which is provided with a flat, annular bearing or contact face 8. The member 7 preferably extends in a direction at right angles to the longitudinal axis of the cylindrical, tubular coupling 5, heretofore described, although it may be otherwise arranged or supported, if desired. Rotatably mounted on the member 7 is a circular disk member 9, having an annular flat face 10 arranged in contact with the face 8, heretofore described, on the member 7, the arrangement being such that a space or recess is afforded between the adjacent faces at the central portion of the members 7 and 9. The members 7 and 9 are held concentric with each other, and with said faces 8 and 10 in engagement, by a headed securing bolt 11 which extends through openings 12 and 13 through the centers of said members and therefore concentric with the said annular faces 8 and 10, said bolt also serving as a pivot about which the member 9 is rotatable relative to the member 7. The bolt 11 is held in place by a nut 14 threaded thereon, and abutting the face of the member 7 opposite to that face which engages the member 9; and a spring washer 15 is located between the end face of the head of the bolt and the adjacent face of the member 9, so as to provide for a somewhat yielding frictional contact between the said members 7 and 9, the degree of such contact being regulated by adjustment of the nut 14. Rigidly connected to the member 9, and for this purpose preferably made integral therewith, is an arm 16 carrying a circular disk member 17 preferably located in a plane at right angles to the plane of the member 9. This disk member 17 is formed on each of its two opposite faces, respectively, with an annular raised contact face, said faces being shown at 18 and 19, respectively, and through said disk and concentric with said contact faces is a central opening 20.

21 designates a supporting plate or disk, preferably circular in general contour, the same being arranged in a plane parallel to the plane of the disk 17 and having an annular flat and raised contact face 22 arranged in facial contact with the annular face 19, heretofore described, on the disk member 17. The member 21 carries spaced cylindrical sleeves 23 in alinement with each other and through which may extend a hollow lamp-supporting member 24 bearing an incandescent light lamp socket 25 and lamp bulb 26, the lamp being supplied with current through conductors 27 extending through the vertical support 1 and through the member 24, just described. It will be understood that my invention is not limited to the specific form of lamp-supporting means embodying the sleeves 23 and tubular member 24, as the latter are merely shown as one form of supporting means which the plate 21 may serve to support. The disk 21 is formed with a central bolt opening 28 to receive a securing- and pivot-bolt, to be presently described.

Located on the opposite side of the disk 17 from the disk 21, is a disk member 29 rotatably engaging the said member 17, and having an annular raised and flat contact face 30 concentric with and engaging the face 18, heretofore described.

The disks 21 and 29 are held in firm but turning engagement with the disk or plate 17 by means of a headed securing- and pivot-bolt 31 extending through the said openings 28 and 20, and an opening 32 in the disk 29, the threaded end of said bolt extending also through an opening 33 in a spring bar or plate 34, said end of said bolt carrying a securing and adjusting nut 35 engaging the outer face of said spring bar. The spring bar or plate 34 extends transversely of the disk member 29 and has its lower ends seated, respectively, in recesses between pairs of lugs 36 located at opposite sides of the center of the disk member 29 and preferably adjacent to the periphery of the latter. The bases of the recesses, against which the ends of the spring bar bear, are located beyond the outer face of the member 29, as shown in Fig. 3, so that the intermediate portion of the spring is spaced from the outer face of the member 29, thereby permitting flexing of the said spring toward the face of said member under force exerted by the nut 35. By this arrangement, when the nut 35 is screwed upon the bolt 31, the spring bar is flexed so as to yieldingly hold the members 21 and 29 in contact with the member 17. The tension placed upon the spring is preferably such as to result in sufficient friction between the faces 18 and 30, and 19 and 22, so that the members 21 and 29 will be prevented from turning under normal conditions, except when desired by the operator. It will be seen that the spring acts to take up all wear on the contact faces between the members 17, 21 and 29 and thereby maintains at all times a tight joint which will not slip. It will also be seen that upon rotation of the plate 29 relative to the plate 17, the spring will turn with the former plate.

Means is provided for connecting the members 21 and 29 whereby the same will turn simultaneously when the operator swings the support 24 to rotate the disk 21 about its pivot. This means consists preferably of an arm 37 integral with the disk 21 and extending laterally beyond the periphery of the said disk, and provided at its end with a lug 38 located beyond the periphery of the member 17 and directed toward the disk 29, as clearly shown in Figs. 3 and 4 of the drawings. The disk member 29 is provided with a laterally projecting arm 39 extending beyond the periphery thereof and beyond the periphery of the disk 17, and provided with laterally projecting spaced lugs 40 extending toward the disk 21 and receiving between them the lug 38, the side faces of which preferably closely engage the inner faces of the lugs 40. It will thus be seen that when the operator, in adjusting the position of the light, grasps the lamp or the member 24 to change the position of the same by swinging the member 21 on its pivot 31, the floating disk 29 will be turned with the disk 21 relative to the intermediate disk member 17, by reason of the engagement between the lugs 38 and 40. It will be noted that in this arrangement the head of the screw bolt 31 is not subjected to wear by turning of the parts 21 and 29 relative thereto, but said bolt being connected to said parts rotates therewith, which is of advantage in that a lock to prevent turning of the bolt is unnecessary, and furthermore, the bolt cannot work loose resulting in such loosening of the joint that the parts would not be held at the points to which they may be adjusted.

The annular friction contact surfaces on the disk members are preferably ground to a smooth even surface, and are located at the extreme outer edges of the disks, thus giving the maximum frictional resistance.

In Fig. 5 I have shown another embodiment of the same invention in which the novel construction, heretofore described, is applied to the disk member of the coupling 5, as well as to the vertical member 17, which serves as a support for the lighting fixture. In this form of the invention I have designated corresponding parts, heretofore described, by exponent reference numerals, which I deem sufficient to give an understanding of this application of the invention without repeating the description heretofore given.

What I claim and desire to secure by Letters Patent of the United States is:—

1. In a device of the character described, an intermediate disk member, outer disk members arranged on the opposite faces thereof, a securing member extending through said disk members, a spring member located on one of said outer disk members and tensioned by said securing member, and means for connecting said outer disk members to cause them to rotate in unison.

2. In a device of the character described, an intermediate disk member, outer disk members arranged on the opposite faces thereof, a securing member extending through said disk members, a spring member located on one of said outer disk members and tensioned by said securing member, and means connecting the peripheries of said outer disk members to cause them to rotate in unison.

3. In a device of the character described, an intermediate disk member, outer disk members arranged on the opposite faces thereof, one of said outer disk members carrying a support, a securing member extending through said disk members, a spring member located on the other of said outer disk members and tensioned by said securing member, and means for connecting the peripheries of said outer disk members whereby they rotate in unison.

4. In a device of the character described, an intermediate disk member, means for supporting the same, outer disk members arranged on the opposite faces of said intermediate disk member, a securing member extending through said disk member, a spring member located on one of said outer disk members and tensioned by said securing member, and means for connecting the peripheries of said outer disk members to cause them to rotate in unison relative to said intermediate disk member.

5. In a device of the character described, a supporting disk member, outer disk members arranged on the opposite faces thereof, one of said outer disk members carrying a support, a securing member extending through said disk members, a spring member located on the other of said outer disk members and tensioned by said securing member, and means for connecting said outer disk members to cause them to rotate in unison.

6. In a device of the character described, a supporting disk member, outer disk members arranged on the opposite faces thereof, one of said outer disk members carrying a support, a securing member extending through said disk members, a spring member located on the other of said outer disk members and tensioned by said securing member, and interlocking means for connecting said outer disk members to cause them to rotate in unison.

7. In a device of the character described, a supporting disk member, outer disk members arranged on the opposite faces thereof, one of said outer disk members carrying a support, a securing member extending through said disk members, a spring member located on the other of said outer disk members and tensioned by said securing member, and interlocking lugs for connecting said outer disk members to cause them to rotate in unison.

8. In a device of the character described, a supporting disk member, outer disk members arranged in rotatable contact with said supporting member, a support carried by one of said outer disk members, a spring plate arranged on the outer face of the other of said outer disk members, securing means extending through said disk members and spring plate, and operable to tension the latter, and means for connecting said outer disk members to cause them to rotate together.

9. In a device of the character described, a supporting disk member, outer disk members arranged in rotatable contact with the opposite faces of said supporting disk member, a support carried by one of said outer disk members, a spring plate on the outer face of the other outer disk member, means to prevent turning of the spring plate relative to said other outer disk member, securing means extending through said disk members and operable to tension said spring plate, and means for connecting said outer disk members to cause them to rotate together.

10. In a device of the character described, a supporting disk member, outer disk members arranged in rotatable contact with the opposite faces of said supporting disk member, a support carried by one of said outer disk members, a spring plate on the outer face of the other outer disk member, spaced lugs on said other disk member engaging said spring plate and preventing turning of the same relative to said other disk member, securing means extending through all of said disk members and operable on said spring plate to tension the latter, and means for connecting said outer disk members to cause them to rotate together.

11. In a device of the character described, a supporting disk member, outer disk members arranged on opposite faces of said supporting disk member, annular friction contact faces between said supporting disk members and said outer disk members, a securing member extending through said disk members, a spring plate carried by one of said outer disk members and held under tension by said securing means, and lamp-supporting means carried by one of said outer disk members.

12. In a device of the character described, a supporting disk member, outer disk members arranged on opposite faces of said supporting disk member and frictionally engaging the latter, a bolt extending through said disk members and maintaining the outer disk members in rotatable engagement with the supporting disk member, a spring plate carried by one of said disk members and acting through said bolt to maintain frictional contact between the disk members, means for preventing rotation of said spring plate relative to the outer disk members, and means for connecting the outer disk members to cause them to rotate together relative to the supporting disk member.

In testimony whereof I have hereunto signed my name in the presence of two subscribing witnesses.

GARRY J. DORMANDY.

Witnesses:
E. H. HAMMOND,
R. U. DAVEY.